350-6.4 SR

XR 3,828,124

/ X 2025L
X 3030D

United States Patent [19]

Baum

[11] 3,828,124

[45] Aug. 6, 1974

[54] DECREASED ROTATION RATE SCANNING DEVICE

[75] Inventor: Richard C. Baum, Vestal, N.Y.

[73] Assignee: The Singer Company, Binghamton, N.Y.

[22] Filed: Mar. 16, 1973

[21] Appl. No.: 342,044

Related U.S. Application Data

[63] Continuation-in-part of Ser. No. 254,217, May 17, 1972, abandoned.

[52] U.S. Cl..................... 178/7.6, 178/7.3 D, 350/6, 350/7, 350/285

[51] Int. Cl...... G02b 17/00, G02f 1/34, H04n 3/08

[58] Field of Search.............. 178/7.6, 7.3 D; 350/6, 350/7, 285

[56] References Cited

UNITED STATES PATENTS 3,614,194 10/1971 Harris.................................... 350/7

*Primary Examiner*—Howard W. Britton
*Attorney, Agent, or Firm*—James C. Kesterson

[57] ABSTRACT

For use in a laser television projector or the like, a scanning system employing a rotary scanner which permits large angles to be scanned with reduced scanner rotational speeds. The rotary scanner is a hollow cylinder of refractive material having reflective internal surfaces defining a prism. A stationary refractor member surrounds a portion of the hollow cylinder and has a complementary curved surface in close proximity to the cylindrical outer surface thereof. The beam to be deflected passes through the refractor member before and after deflection by the reflective surfaces; thus the deflection angle is increased by refraction as the beam exits from the refractor into the surrounding air.

8 Claims, 2 Drawing Figures

3828124
NO OR CLASSIF

DECREASED ROTATION RATE SCANNING DEVICE

CROSS-REFERENCE TO RELATED APPLICATION

This application is a continuation-in-part of Ser. No. 254,217 filed May 17, 1972 and assigned to the same assignee as the present invention and now abandoned.

BACKGROUND OF THE INVENTION

1. Field of the Invention

This invention relates to optical scanning devices in general and, in particular, to rotary optical scanning systems useful in a laser television projector.

2. Description of the Prior Art

In typical laser projectors, the laser beam is modulated by a video signal and then deflected in mutually orthogonal directions to produce a raster scan display on a projection screen.

One of the more difficult technological problems presented by systems of this type resides in the design of the raster scan generating mechanism. In its most common form such mechanisms employ a rotating prism or multi-faceted reflector of some sort. Typical optical scanning systems of this type are shown in U.S. Pat. Nos. 3,448,458 and 3,450,455. While systems of this type are satisfactory for such applications as data recording, when employed to generate a raster scan for display of images of television quality, extremely high deflector rotational speeds become necessary. These speeds may be so high, e.g., in the order of several hundred thousand revolutions per minute, that they not only create problems of design and reliability in the drive motor but actually severely test the physical integrity of the rotating element subjecting it to distortion and, sometimes, mechanical failure.

One approach to the solution of this problem is to increase the number of facets on the rotating element but this necessarily causes a reduction in the angle scanned by each facet. Another solution to the problem is that shown in U.S. Pat. No. 3,507,984 granted to G. Stavis and assigned to the same assignee as the present invention. The rotating deflector disclosed in the Stavis patent produces both the horizontal and vertical ("fast and slow") scan, respectively, with a single rotating element which operates at acceptable rotational speeds.

The present invention provides an alternative solution to the problem of high deflector rotational speeds which is applicable to systems having individual deflectors for X and Y scans.

It is the prime general object of the present invention to provide an optical scanning system which avoids or at least mitigates the problem of high deflector rotational speed extant in the prior art as outlined above.

A more specific object is the provision of an optical scanning system usable in laser television projectors permitting the attainment of high scan rates at relatively moderate rotational speeds.

A further object is the provision of a rotary optical scanner which achieves television scan rates and can be operated at relatively moderate rotational speeds without reduction in the scan angle.

SUMMARY OF THE INVENTION

To the attainment of the foregoing and other objects, the invention contemplates a scanner system for deflecting a beam of electromagnetic radiation which comprises a rotary scanner member configured as a hollow body of refractive material having a cylindrical external surface and reflective internal surface formed of parallelograms defining a prism which has its longitudinal axis coincident with that of the cylindrical external surface. The scanner member is mounted for rotation about the coincident axes and a refractor member is mounted in close proximity thereto. The refractor member has a curved surface conforming to and closely spaced from the external surface of the scanner member and a plane surface opposite to the curved surface. The dimensions of the refractor member are such that all rays of radiation reflected by the internal surface of the scanner member pass through the plane surface of the refractor member.

DESCRIPTION OF THE PREFERRED EMBODIMENT

While the high scan rates required for generating laser television images present a prime field of utility for the presen invention, and it will be described by way of example in this context, it will be appreciated that it will find application in any field where it it necessary to deflect electromagntic radiation, in either the visible or invisible spectrum, with relatively large scan angles and low deflector rotational speeds.

Figure 1:
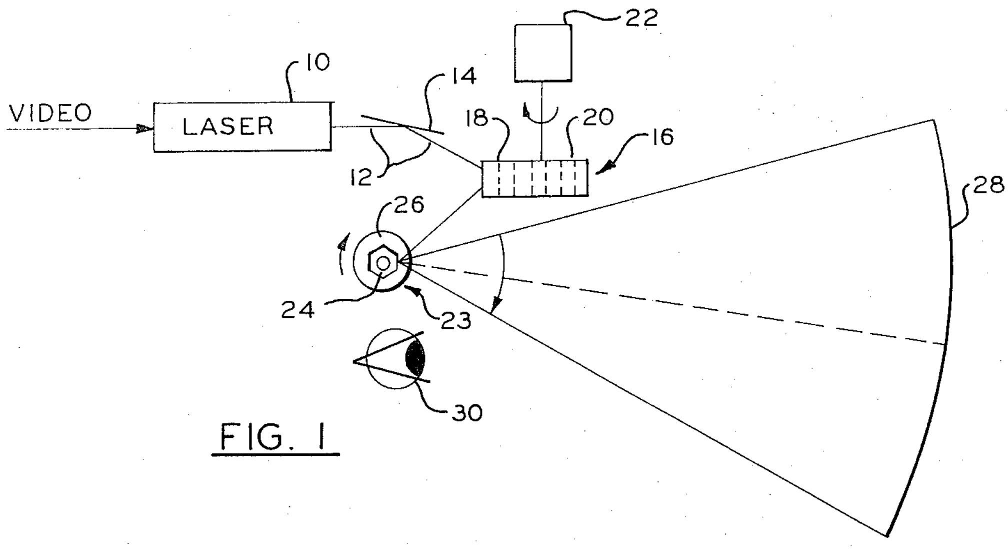
FIG. 1 is an optical schematic of a scanner system embodying the present invention.

Referring now to the drawing and first particularly to FIG. 1, a laser and modulator unit of conventional design is symbolically represented at 10 and provides a coherent beam 12 of light modulated by a video signal. A reflector 14 is mounted adjacent laser 10 at a suitable angle to deflect beam 12 to a horizontal or fast scan rotary deflector 16, hereinafter described in detail. At this juncture suffice it to say that deflector 16 consists of a rotating scanner member 18 and a stationary refractor member 20. Scanner member 18 is driven by a motor 22 in a rotational mode at rates which will produce the desired horizontal scan for a television raster. A second scanner 23 comprises a rotary deflector element 24 mounted for rotation about an axis orthogonal to that of scanner member 18 and driven in a rotational mode by a motor 26. Scanner element 24, shown in cross-section in FIG. 1, is represented as a hexagonal prism and is located so as to intercept rays reflected from scanner 16 and reflect such rays to a projection screen 28.

Scanner 23 provides the vertical or slow scan for the television raster and, consequently, it rotates at a much lower speed than the horizontal scan deflector member 18. While it is not apparent in FIG. 1, vertical scanner member 24 is elongated in a direction perpendicular to the plane of the drawing so that it will accommodate the extent of horizontal scan imparted to the beam by deflector 16. The image projected on screen 28 may be observed from a suitable eyepoint represented at 30.

Except for the particular construction of the horizontal scanner 16, to be described presently, it will be understood that the laser television projection system illustrated in FIG. 1 and briefly described above is in all other respects conventional, making further explanation unnecessary.

Figure 2:
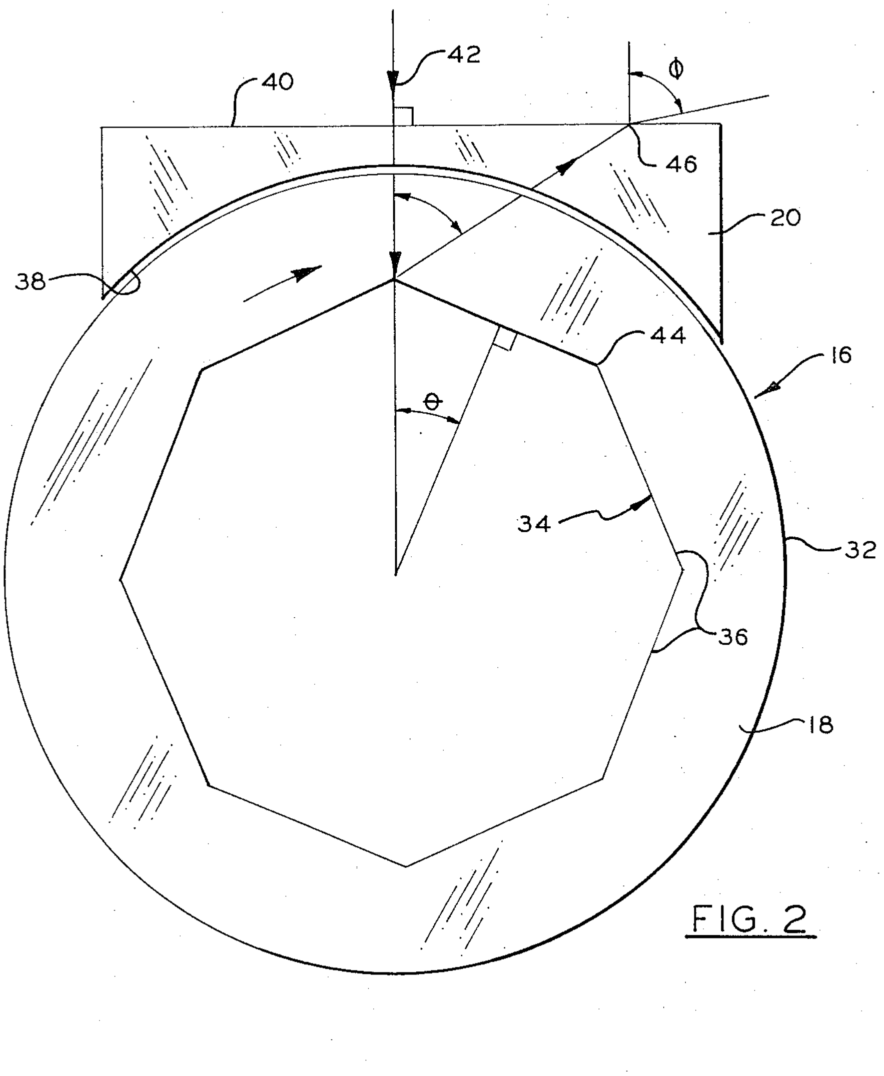
FIG. 2 is a plan view on an enlarged scale of the rotational deflector shown in FIG. 1 constructed in accordance with a preferred embodiment of the present invention.

Referring now to FIG. 2, it will be seen that the scanner member 18 is in the form of a hollow cylinder of refractive material having an external cylindrical surface 32 and an internal surface 34 appearing in cross-section as a regular octagon having faces 36. In three dimensions, each of the faces 36 is an identical parallelogram and jointly they define a regular octagonal prism having its longitudinal axis coincident with that of the cylindrical surface 32. Faces 36 are provided with a reflective coating, not evident in the drawing. The coincident axes of the prismatic and cylindrical surfaces form the axis of revolution about which member 18 is driven by motor 22 in the manner previously explained with reference to FIG. 1.

Stationary refractor member 20 is fixedly mounted in close proximity to cylindrical member 18. Member 20 may take the form of a solid piece of the same refractive material as member 18 and has a cylindrically-curved concave surface 38 complementary to and mounted with only clearance space from surface 32 of member 18. For reasons which will become apparent as this description proceeds, it is important that the space between the mating convex and concave cylindrical surfaces 32 and 38 of members 18 and 20, respectively, be held to a minimum within practical limits. Ideally, the two surfaces could be in contact except for the friction and abrasion which would result.

Opposite its concave surface 38 member 20 has a plan surface 40 parallel to a plane tangent to the concave surface. The diemsnions of refractor 20 are such that any light ray, e.g., 42, reflected from the prism surfaces 36 passes through the plane surface 40 thereof.

Before explaining the operation of the scanner shown in FIG. 2, the operation of a conventional rotary scanner will be explained. For this purpose, it will be assumed that the rotary deflector takes the form of an octagonal prism having reflective external surfaces; in other words, a prism in the form of the hollow interior of member 18 in FIG. 2.

With such a conventional deflector, each facet 36 subtends an angle 2$\theta$. A ray 42 striking one edge of a face 36 is reflected at an angle of 2$\theta$. When that face is displaced due to the rotation of member 18 so that ray 42 strikes its opposite edge, i.e., at 44, the ray is deflected at an angle 2$\theta$ in the opposite direction thus producing a total scan angle of 4$\theta$. Expressed in general terms, there is a ration 2:1 between the deflection angle and rotation angle.

Assuming for the sake of example that a conventional deflector is a 5-sides prism, in this case 2$\theta$ is equal to 72° and the total angle of deflection is 144°. Further assuming a 1000-line television system and a standard frame rate of 30 per second, 1,000 scan lines must be generated every 1/30 of a second. Consequently, the deflector must be rotated at 1,000 lines/frame × 30 frames/sec. × 1 revolution/5 lines × 60 sec./1 min. = 360,000 RPM The mechanical and physical problems in achieving such a high rate of angular rotation is self-evident.

The operation of a scanner embodying the present invention will now be described with reference to FIG. 2 and contrasted with that of a conventional scanner. The incident ray 42 enters refractor 20 perpendicular to its plan surface 40 and exits through its concave surface, passing through the clearance gap and into scanner member 18. As the ray is normal no defraction occurs at its points of entry and exit to and from refractor member 20 and deflector member 18.

As the ray encounters the reflective internal surfcace 34 of member 18, it is reflected in the same manner as in a conventional system where reflection occurs at the external surface of the scanner. The reflected ray passes back through member 18, traverses the clearance gap and exits from refractor 20 at a point 46 in its plane surface where refraction takes place, increasing the angle.

As in the assumed conventional case described above, the angle of reflection at the edge of an internal face 36 is 2$\theta$, i.e., twice the rotation from a point where ray 42 would be normal to face 36 and, due to the presence of refractor member 20, the total deflection angle at point 46 is $\phi$. The relationship betwen $\theta$ and $\phi$ is $$\phi = \sin^{-1} [N \sin(2\theta)]$$

where $N$ is the index of refraction. Without refractor member 20, ile., in convention systems, $N = 1$ and $\phi = 2\theta$ as described above. With a rotation rate $\dot{\theta}$, $$\dot{\phi} = [2N \cos (2\theta)/\sqrt{1 - N^2 \sin^2 (2\theta)}]\ \dot{\theta}$$

The ratio at $\theta = 0°$ is $\phi/\theta = 2N$ or $N$ times the ratio for conventional systems.

It should be noted that the scan produced with refractor member 20 is non-linear. Accordingly, provision must be made to scan the video pickup device in a similarly non-linear manner to obtain a display in proper perspective. Such scanning techniques are well-known in the art.

It is recognized that the non-linearity inherent in the scanner may be unacceptable in certain applications. The scan will be more nearly linear at the center of the field and become increasingly faster with a concomitant degradation of resolution at the edges. One particular application where this inherent characteristic is not only tolerable bur particularly useful is in a visual system for flight or other vehicle simulators. The operator in such training devices is primarily concerned with the view directly to the force and uses the view to the side for cues only. For this purpose, high resolution is not required. Thus, a wide field of view may be presented with a single laser projector using the scanner of the present invention whereas previously two or more projectors normally would have been used to obtain the same field.

Materials usable for construction of the deflector member 18 and refractor member 20 having refractive indices just slightly less than two are currently available. For example, a material known as SFSI with an index of 1.93 is available from O'Hara Glass Company. Thus for $N = 1.93$ and $\theta = 15°$ (i.e., $2\theta = 30°$):

$$\phi = \sin^{-1} [1.93 \sin (30)]$$

$$\phi = \sin^{-1} [0.965]$$

$$\phi = 75°$$

Using the material described above, the inner surface of member 18 could contain 12 facets of angle $2\theta = 30°$ and still have a 150-degree total deflection. In terms of rotational speed, the 360,000 RPM previously computed for a five-sided prism is reduced by a factor of 5/12 to 150,000 RPM.

Thus a system has been described which achieves the objects hereinabove set forth permitting a significant reduction in the rotational rate of a television laser scanner. It will be obvious to those skilled in the art that various modifications may be made without departing from the spirit of the invention which is intended to be solely limited by the appended claims.

What is claimed is:

1. A scanner system for deflecting a beam of electromagnetic radiation, comprising:

a. a scanner member configured as a hollow body of refractive material having a cylindrical external surface and reflective internal surface formed of parallelograms defining a prism which has its longitudinal axis coincident with that of said cylindrical external surface;

b. means mounting said scanner member for rotation about said coincident axes; and c. a refractor member mounted in close proximity to said scanner member, said refractor member being configured as a solid piece of refractive material having 1. a curved surface conforming to, and slightly spaced from, the external surface of said scanner member; and 2. a plane surface opposite to said curved surface, the dimensions of said refractor member being such that all rays of radiation reflected by said internal surfaces of the scanner member pass through said plane surface.

2. A scanner system according to claim 1 further comprising means to rotate said scanner member, whereby radiation incident upon the plane surface of said refractor member is reflected by said internal surfaces along plural paths in a single plane.

3. A scanner system according to claim 2 wherein said rotating means causes said scanner member to make multiple complete revolutions, whereby said beam is cyclically and repetitively deflected.

4. A scanner system according to claim 3 further comprising:

a. means for generating a beam of light to impinge upon the plane surface of said refractor member in a plane containing said coincident axes and perpendicular to said plane surface; and b. a second scanner positioned to intersect the deflected beam and further deflect said beam in a direction orthogonal to the plane of the first deflection.

5. A scanner system according to claim 4 wherein the rotational rate of said scanner member and the scan rate of said second scanner are such as to cause the beam to describe a raster pattern after deflection by said second scanner.

6. A scanner system according to claim 4 wherein tthe rotational rate of said scanner member and the scan rate of said second scanner respectively correspond to predetermined horizontal and vertical television scan rate frequencies.

7. A scanner system according to claim 6 further including means to modulate said beam with a video signal.

8. A scanner system according to claim 7 wherein said light beam generating means is a laser.

* * * * *